US009544506B1

(12) United States Patent
Wang et al.

(10) Patent No.: US 9,544,506 B1
(45) Date of Patent: Jan. 10, 2017

(54) IMAGE PROCESSING METHOD FOR IMAGE CAPTURING DEVICE

(71) Applicant: NOVATEK Microelectronics Corp., Hsin-Chu (TW)

(72) Inventors: Kai-Wen Wang, Taoyuan (TW); Qingjie Chen, Shanghai (CN); Shaoxiong Li, Xi'an (CN); Yen-Hsi Lee, Taichung (TW); Jia-Xiu Liu, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 14/835,735

(22) Filed: Aug. 26, 2015

(51) Int. Cl.
*H04N 5/235* (2006.01)

(52) U.S. Cl.
CPC .......... *H04N 5/2355* (2013.01); *H04N 5/2353* (2013.01)

(58) Field of Classification Search
CPC .................................................. H04N 5/2355
See application file for complete search history.

(56) References Cited

U.S. PATENT DOCUMENTS

| 9,251,573 B2* | 2/2016 | Kobayashi | G06T 5/009 |
| 9,344,636 B2* | 5/2016 | Tico | H04N 5/23277 |
| 2011/0222793 A1* | 9/2011 | Ueda | H04N 5/2355 382/284 |
| 2013/0076937 A1* | 3/2013 | Tajima | H04N 5/355 348/223.1 |
| 2013/0287296 A1* | 10/2013 | Li | H04N 5/2355 382/167 |
| 2014/0016001 A1* | 1/2014 | Ichikawa | H04N 5/2353 348/229.1 |
| 2015/0036878 A1* | 2/2015 | Nashizawa | G06T 5/50 382/103 |

* cited by examiner

*Primary Examiner* — James Hannett
(74) *Attorney, Agent, or Firm* — Winston Hsu; Scott Margo

(57) ABSTRACT

An image processing method includes acquiring a first image during a first exposure time, and a second image during a second exposure time, wherein the first exposure time is smaller than the second exposure time; acquiring the image region with the luminance greater than a first threshold in the second image as a first over-exposure region; acquiring the image region located at corresponding positions of the first over-exposure region and in the first image as a second over-exposure region; comparing the second over-exposure region and the first over-exposure region, for acquiring a first moving-object region; excluding the first moving-object region from the second over-exposure region, to generate a third over-exposure region; acquiring the image region located at corresponding positions of the third over-exposure region and in the second image as a fourth over-exposure region; and combining the third over-exposure region and the fourth over-exposure region.

12 Claims, 5 Drawing Sheets

IMAGE PROCESSING METHOD FOR IMAGE CAPTURING DEVICE

BACKGROUND OF THE INVENTION

1. Field of the Invention

The present invention relates to an image processing method of combining a plurality of images, and more particularly, to an image processing method capable of effectively eliminating the effects of moving objects when combining a plurality of images.

2. Description of the Prior Art

A ratio of the highest luminance to the lowest luminance in a scene is defined as a dynamic range of the scene. Typically, the dynamic range of the real world is over 50,000:1, and the dynamic range of the human vision system (HVS) is over 10,000:1. Moreover, in some specific lighting condition, human eyes can differentiate some 10,000 colors. Thus, human eyes can detect different luminance in the real word to a fairly satisfactory degree.

Image capturing devices (such as cameras) or image display devices (such as computer displays) commonly used for processing images, however, have a dynamic range far less than the dynamic range of the real world. Therefore, those image devices are unable to capture or display details of high luminance (i.e. over-exposure) or low luminance (i.e. under-exposure) regions in a scene in some condition. For example, an image capturing device or an image display device having a dynamic range of 255:0 may treat all pixels in a high luminance region in a scene as white pixels having grayscale values of (255, 255, 255), or treat all pixels in a low luminance region in a scene as black pixels having grayscale values of (0, 0, 0). In other words, those image devices are unable to record details of high luminance or low luminance regions in a scene.

Generally, an image having a high dynamic range is called a high dynamic range (HDR) image. Presently, there is no simple and direct way to capture or display an HDR image. Therefore, an alternative method to execute multiple exposures in a scene to capture a plurality of low dynamic range (LDR) images and then combine the LDR images into an HDR image of the scene is provided.

Inevitably, there is always a time lag between the timings of capturing the plurality of LDR images. During the time lag, random objects in the captured scene may move and the positions of the random object may be different in the plurality of LDR images. When combining the plurality of LDR images to generate the HDR image, the random objects moving during the time lags may cause undesired effects (e.g. ghosts and broken objects) in the HDR image. Thus, how to eliminate the undesired effects generated by the moving objects becomes a topic to be discussed.

SUMMARY OF THE INVENTION

In order to solve the above problem, the present invention provides an image processing method capable of effectively eliminating the effects of moving objects when combining a plurality of images.

In an aspect, the present invention discloses an image processing method. The image processing method comprises acquiring a first image during a first exposure time, and a second image during a second exposure time, wherein the first exposure time is smaller than the second exposure time; acquiring the image region with the luminance greater than a first threshold in the second image as a first over-exposure region; acquiring the image region located at corresponding positions of the first over-exposure region and in the first image as a second over-exposure region; comparing the second over-exposure region of the first image and the first over-exposure region of the second image, for acquiring a first moving-object region; excluding the first moving-object region from the second over-exposure region, to generate a third over-exposure region; acquiring the image region located at corresponding positions of the third over-exposure region and in the second image as a fourth over-exposure region; and combining the third over-exposure region of the first image and the fourth over-exposure region of the second image.

In another aspect, the present invention discloses an image processing method. The image processing method comprises acquiring a first image during a first exposure time, and a second image during a second exposure time, wherein the first exposure time is smaller than the second exposure time; acquiring the image region with the luminance smaller than a first threshold in the first image as an first under-exposure region; acquiring the image region located at corresponding positions of the first under-exposure region and in the second image as a second under-exposure region; comparing the first under-exposure region of the first image and the second under-exposure region of the second image, for acquiring a moving-object region; excluding the moving-object region from the second under-exposure region, to generate a third under-exposure region; acquiring the image region located at corresponding positions of the third under-exposure region and in the first image as a fourth under-exposure region; and combining the third under-exposure region of the second image and the fourth under-exposure region of the first image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
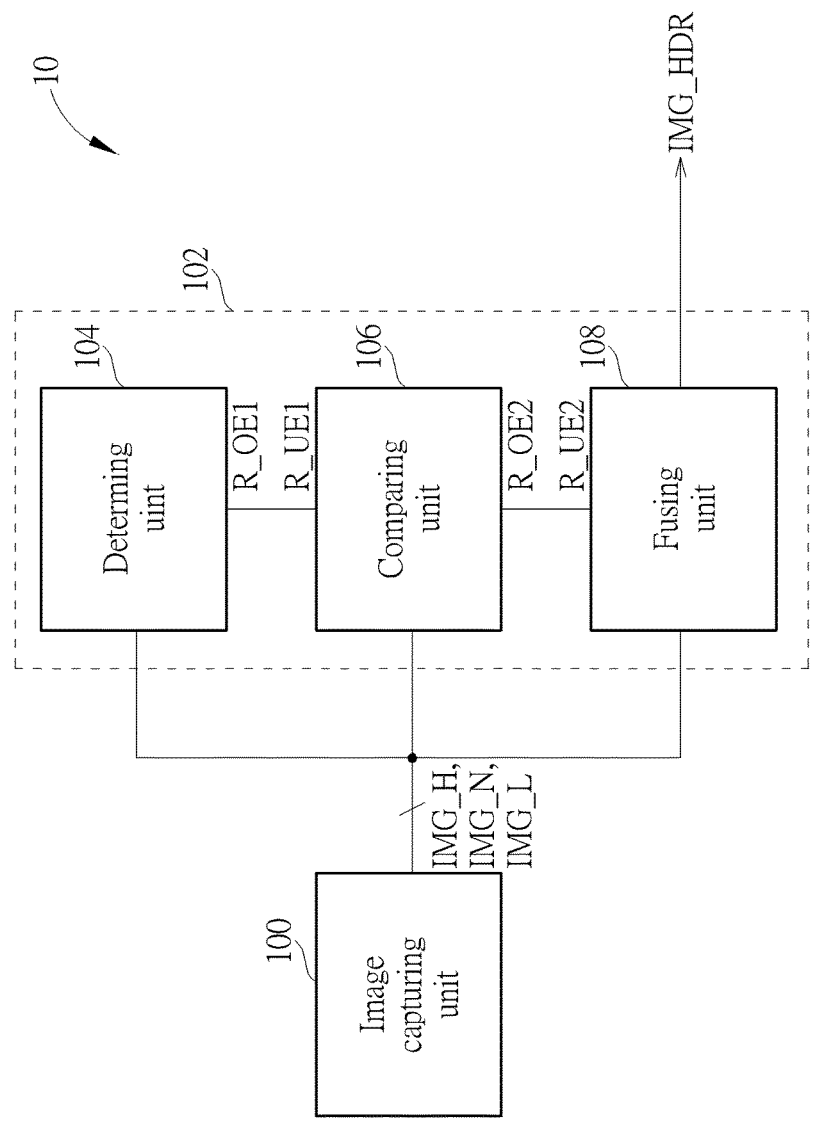
FIG. 1 is a schematic diagram of an image capturing device 10 according to an example of the present invention.

Please refer to FIG. 1, which is a schematic diagram of an image capturing device 10 according to an example of the present invention. The image capturing device 10 may be an electronic product equipping with an image capturing function, such as a smart phone, a tablet or a digital camera, and is not limited herein. As shown in FIG. 1, the image capturing device 10 comprises an image capturing module 100 and a computing module 102. The image capturing module 100 is utilized for sequentially acquiring images IMG_L, IMG_N, IMG_H during different exposure times. The computing module 102 comprises a determining unit 104, a comparing unit 106 and a fusing unit 108, and is utilized for combining the images IMG_L, IMG_N and IMG_H to generate a high-dynamic-range (HDR) image IMG_HDR. Before combining the images IMG_L, IMG_N and IMG_H, the computing module 102 detects moving objects in the images IMG_L, IMG_N and IMG_H via dividing the image IMG_N into a plurality of image regions according to the luminance of each pixel in the image IMG_N and compares the images IMG_L and IMG_H with the corresponded image regions of the image IMG_N. The computing module 102 therefore can effectively acknowledge the positions of the moving objects in the images IMG_L and IMG_H and accordingly combine the images IMG_H, IMG_N and IMG_L without being affected by the moving objects.

In details, the image capturing unit 100 acquires (e.g. captures) the image IMG_L during an exposure time T_EL, acquires the image IMG_N during an exposure time T_EN and acquires the image IMG_H during an exposure time T_EH in a row, wherein the exposure time T_EL is smaller than the exposure time T_EN and the exposure time T_EN is smaller than the exposure time T_EH (i.e. T_EL<T_EN<T_EH). As a result of limited dynamic range of the image capturing unit 100, the image IMG_N may have an over-exposure region R_OE1, where the luminance of the pixels are too high to show the image details, and an under-exposure region R_UE1, where the luminance of the pixels are too low to show the image details. Since the exposure time T_EL is smaller than the exposure time T_EN, the image details of an over-exposure region R_OE2 corresponding to the over-exposure region R_OE1 in the image IMG_L, i.e. the region located at the corresponded position of the over-exposure region R_OE1 and in the image IMG_L, are clear and can be recognized. Thus, the fusing unit 108 fuses the over-exposure region R_OE1 of the image IMG_N with the over-exposure region R_OE2 of the image IMG_L, to allow the HDR image IMG_HDR to have recognizable image details in the over-exposure region R_OE1. Similarly, since the exposure time T_EN is smaller than the exposure time T_EH, the image details of a under-exposure region R_UE2 corresponding to the under-exposure region R_UE1 in the image IMG_H, i.e. the region located at the corresponded position of the over-exposure region R_OE1 and in the image IMG_L, are clear and can be recognized. Thus, the fusing unit 108 fuses the under-exposure region R_UE1 of the image IMG_N with the under-exposure region R_UE2 of the image IMG_H, to allow the HDR image IMG_HDR to have recognizable image details in the under-exposure region R_UE1.

In order to combine the over-exposure region R_OE1 of the image IMG_N with the over-exposure region R_OE2 of the image IMG_L and fuse the under-exposure region R_UE1 of the image IMG_N with the under-exposure region R_UE2 of the image IMG_L, the determining unit 104 takes the image IMG_N as a reference image and divides the image IMG_N according to the luminance of each pixel in the image IMG_N to acquire the over-exposure region R_OE1 and the under-exposure region R_UE1 in the image IMG_N. In an example, the determining unit 104 determines a pixel in the image IMG_N belongs to the over-exposure region R_OE1 when the luminance of the pixel is greater than a threshold TH1. In another example, the determining unit 104 determines a pixel in the image IMG_N belongs to the under-exposure region R_UE1 when the luminance of the pixel is smaller than a threshold TH2. For example, the threshold TH1 may be 250 and the threshold TH2 may be 5 when the luminance range is from 255 to 0.

During the time interval between the timings of acquiring the images IMG_L and the IMG_N, the objects in the captured scene may move and the positions of the moving objects would be different in the images IMG_L and the IMG_N. Under such a condition, the luminance of the pixels corresponding to the moving objects in the IMG_L would be quite different from that of the pixels located at the corresponded positions in the image IMG_N. In order to avoid the moving objects affect the quality of the HDR image IMG_HDR, the comparing unit 106 compares luminance of each pixel in the over-exposure region R_OE1 of the image IMG_N with that of the pixel at the corresponded position in the over-exposure region R_OE2 of image IMG_L and determines the pixel is in a moving object region R_MO1 (i.e. the pixels corresponding to the moving objects in the image IMG_L) when the luminance difference is greater than a threshold TH3. For example, the pixel values of a pixel in the images IMG_L and IMG_N should be proportional to the exposure times T_EL and T_EN of the images IMG_L and IMG_N. When the ratio between the exposure times T_EL and T_EN is 0.8 and the pixel value of the pixel in the image IMG_N is 100, the pixel value of the pixel in the images IMG_L should be 80. If the pixel value of the pixel in the images IMG_L significantly deviates from 80 (e.g. changing to 255 or 0), the comparing unit 106 determines the pixel belongs to the moving object region R_MO1.

Similarly, the comparing unit 106 compares luminance of each pixel in the under-exposure region R_UE1 of the image IMG_N with that of the pixel at the corresponded position in the under-exposure region R_UE2 of image IMG_H and determines the pixel is in the moving object region R_MO2 when the luminance difference is greater than a threshold TH4. Note that, the method of comparing unit 106 detecting the moving object regions R_MO1 and R_MO2 can be appropriately modified according to different applications and design concepts, and is not limited herein. In an example, the comparing unit 106 may use a multi-level-thresholding (MLT) method to acquire the moving object regions R_MO1 and R_MO2. After acquiring the moving object regions R_MO1 and R_MO2, the comparing unit 106 excludes the moving object regions R_MO1 from the region R_OE2 to generate an over-exposure region R_OE3 and excludes the moving object regions R_MO2 from the under-exposure region R_UE2 to generate an under-exposure region R_UE3.

According to the over-exposure region R_OE3 and under-exposure region R_UE3, the fusing unit 108 begins to combine the images IMG_L, IMG_N and IMG_H. The fusing unit 108 defines an over-exposure region R_OE4 in the image IMG_N according to the over-exposure region R_OE3, wherein the over-exposure region R_OE4 is the region located at the corresponded position of the over-exposure region R_OE3 and in the image IMG_N. Similarly, the fusing unit 108 defines a under-exposure region R_UE4 in the image IMG_N according to the under-exposure region R_UE3, wherein the under-exposure region R_UE4 is the region located at the corresponded position of the under-exposure region R_UE3 and in the image IMG_N. The fusing unit 108 combines (e.g. compensates) the image details in the over-exposure region R_OE4 of the image IMG_N with those in the over-exposure region R_OE3 of the image IMG_L and combines the image details in the under-exposure region R_UE4 of the image IMG_N with those in the under-exposure region R_UE3 of the image IMG_H, to generate the HDR image IMG_HDR. As a result, the over-exposure region and the under-exposure region in the HDR image IMG_HDR would clearly show the image details. Since the moving object regions R_MO1 and R_MO2 are excluded from the over-exposure region R_OE2 and the under-exposure region R_UE2, respectively, the image details of the moving objects would not be combined to the HDR image IMG_HDR and the undesired effects generated by the moving objects in the HDR image IMG_HDR can be avoided.

Note that, in order to improve the quality of the HDR image IMG_HDR, the over-exposure region R_OE1 and/or the under-exposure region R_UE1 may be shrunk before detecting the moving object regions R_MO1 and R_MO2. In addition, the moving object regions R_MO1 and/or R_MO2 may be expanded before the generation of the over-exposure region R_OE3 and the under-exposure region R_UE3 for the same reason.

Further, the fusing unit 108 may consider the image details of the moving object regions R_MO1 and R_MO2 when combining the images IMG_L, IMG_N and IMG_H. For example, the fusing unit 108 may combine the image details in the over-exposure region R_OE1 of the image IMG_N with those in the over-exposure region R_OE2 of the image IMG_L and decrease the weighting of the image details in the object region R_MO1 to reduce the effects of the moving objects. Similarly, the fusing unit 108 may combine the image details in the over-exposure region R_OE1 of the image IMG_N with those in the over-exposure region R_OE2 of the image IMG_H and decrease the weighting of the image details in the object region R_MO2 to reduce the effects of the moving objects.

Figure 2A:
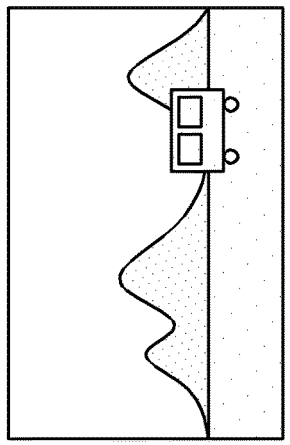
FIGS. 2A-2C are schematic diagrams of images acquired by the image capturing the shown in FIG. 1.
Figure 2A:
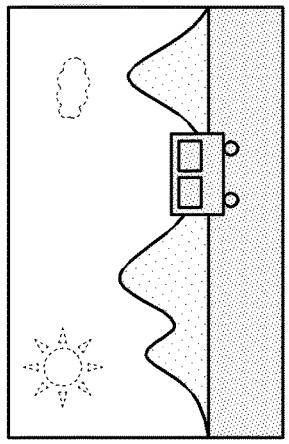
Figure 2A:
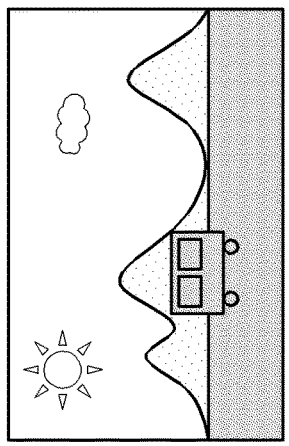
Figure 2B:
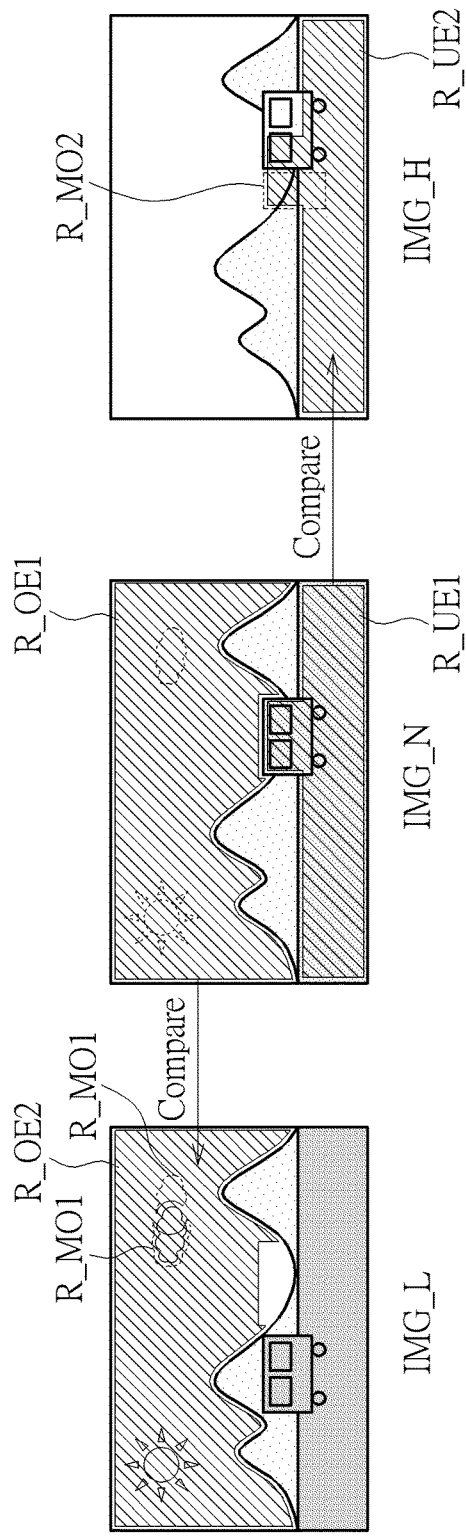
Figure 2C:
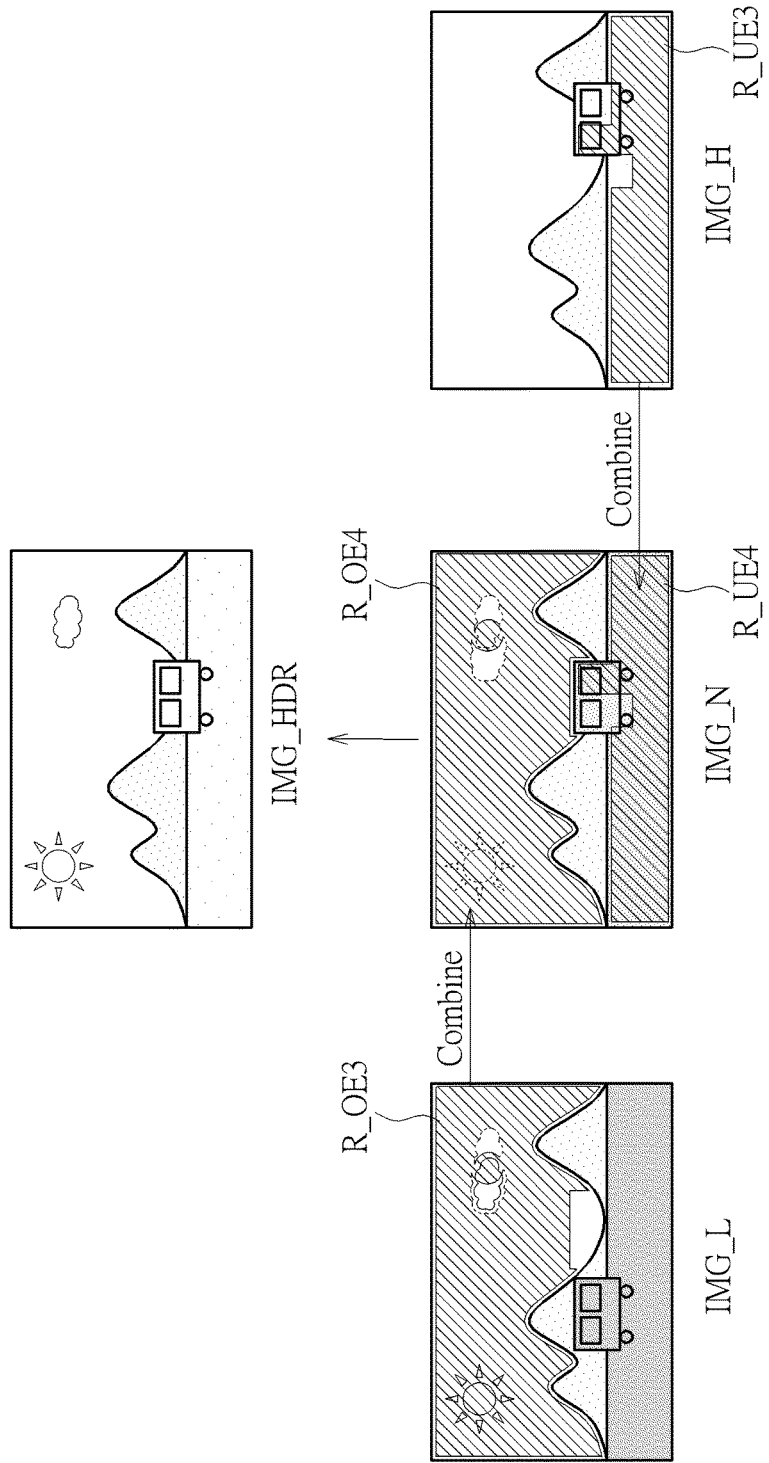

Please refer to FIGS. 2A-2C, which are schematic diagrams of images IMG_L, IMG_N and IMG_H according to an example of the present invention. As shown in FIG. 2A, the captured scene comprises a high luminance region of sky, a medium luminance region of mountains and a low luminance region of a car and roads. In the image IMG_L, the image details of the sky and the mountains (i.e. the high luminance region and the medium luminance region) are clear and the image details of the car and the roads (i.e. the low luminance region) cannot be recognized since the exposure time T_EL is too short. In the image IMG_N, the image details of the sky, the car and the roads are barely recognized and the image details of the mountains are clear. Because of the long exposure time T_EH, the image details of the mountains, the car and the roads are clear in the image IMG_H.

Please refer to FIG. 2B, the determining module 104 divides the image IMG_N according to the luminance of each pixel in the image IMG_N and accordingly acquires the high luminance region as the over-exposure region R_OE1 and the low luminance region as the under-exposure region R_UE1. Note that, the over-exposure region R_OE1 is shrunk in this example. Next, the comparing unit 106 defines the region located at corresponding position of the over-exposure region R_OE1 and in the image IMG_L as the over-exposure region R_OE2 and compares the over-exposure region R_OE1 in the image IMG_N with the over-exposure region R_OE2 in the image IMG_L. In FIG. 2B, the comparing unit 106 acquires the moving object regions R_MO1 wherein the moving object regions R_MO1 comprise the left part of moving cloud in the image IMG_L and the right part of moving cloud in the image IMG_N. Next, the comparing unit 106 excludes the moving object region R_MO1 from the over-exposure region R_OE2 to generate the over-exposure region R_OE3. Note that, the moving-object region R_MO1 is expanded before the comparing unit 106 excludes the moving object region R_MO1 from the over-exposure region R_OE2 in this example. Similarly, the comparing unit 106 defines the region located at corresponding position of the under-exposure region R_UE1 and in the image IMG_H as the under-exposure region R_UE2 and compares the under-exposure region R_UE1 in the image IMG_N with the under-exposure region R_UE2 in the image IMG_H. In this example, the comparing unit 106 acquires the moving object region R_MO2 comprising the left part of the car in the image IMG_H and excludes the moving object region R_MO2 from the under-exposure region R_UE2 to generate the under-exposure region R_UE3.

Please refer to FIG. 2C, the fusing unit 108 defines the region located at corresponding position of the over-exposure region R_OE3 and in the image IMG_N as the over-exposure region R_OE4 and defines the region located at corresponding position of the under-exposure region R_UE3 and in the image IMG_N as the under-exposure region R_UE4. Next, the fusing unit 108 compensates the image details in the over-exposure region R_OE4 of the image IMG_N according to those in the over-exposure region R_OE3 of the image IMG_L and compensates the image details in the under-exposure region R_UE4 of the image IMG_N according to those in the under-exposure region R_UE3 of the image IMG_H, to generate the HDR image IMG_HDR. As a result, the image details of the high-luminance region and the low-luminance region in the HDR image IMG_HDR are clear to be recognized.

The above example acquires images during different exposure times and divides a reference image (i.e. the image IMG_N) in the plurality of images into the high luminance region, the medium luminance region and the low luminance region according to the luminance of the pixels in the reference image. Next, the above example compares the high luminance region in the reference image with that of the images acquired during shorter exposure time (i.e. the image IMG_L) and compares the low luminance region in the reference image with that of the images acquired during longer exposure time (i.e. the image IMG_H), to detect the objects moving during the time intervals of acquiring the images. Since the above example does not compare whole reference image with other images for detecting the moving objects, the computing cost of detecting the moving objects is therefore reduced. According to different applications and design concepts, those with ordinary skill in the art may observe appropriate alternations and modifications. For example, the number of images acquired by the image capturing unit 100 and the number the regions generated by dividing the reference image according to the luminance level may be appropriately adjusted. In addition, the method of the detecting the moving objects in the over-exposure region R_OE2 and the under-exposure region R_UE2 may be various and is not limited to the above example.

Figure 3:
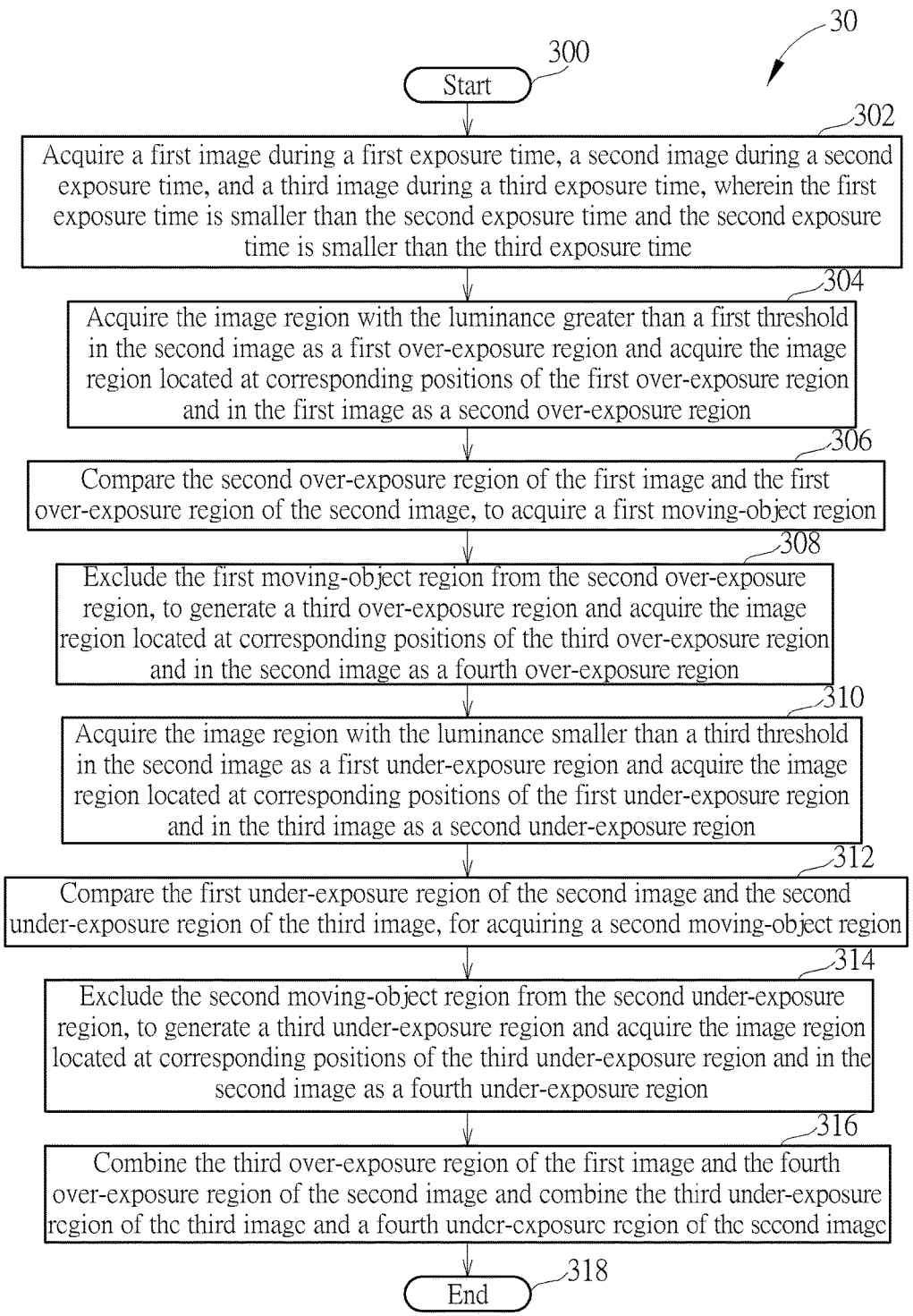
FIG. 3 is a flowchart of an image processing method according to an example of the present invention.

The process of the computing module 102 combining the images IMG_L, IMG_N and IMG_H can be summarized into an image processing method 30 shown in FIG. 3. The image processing method 30 is utilized in an electronic product equipping with an image capturing function, such as a smart phone, a tablet or a digital camera, and comprises the following steps:

Step 300: Start.

Step 302: Acquire a first image during a first exposure time, a second image during a second exposure time, and a third image during a third exposure time, wherein the first exposure time is smaller than the second exposure time and the second exposure time is smaller than the third exposure time.

Step 304: Acquire the image region with the luminance greater than a first threshold in the second image as a first over-exposure region and acquire the image region located at corresponding positions of the first over-exposure region and in the first image as a second over-exposure region.

Step 306: Compare the second over-exposure region of the first image and the first over-exposure region of the second image, to acquire a first moving-object region.

Step 308: Exclude the first moving-object region from the second over-exposure region, to generate a third over-exposure region and acquire the image region located at corresponding positions of the third over-exposure region and in the second image as a fourth over-exposure region.

Step 310: Acquire the image region with the luminance smaller than a third threshold in the second image as a first under-exposure region and acquire the image region located at corresponding positions of the first under-exposure region and in the third image as a second under-exposure region.

Step 312: Compare the first under-exposure region of the second image and the second under-exposure region of the third image, for acquiring a second moving-object region.

Step 314: Exclude the second moving-object region from the second under-exposure region, to generate a third under-exposure region and acquire the image region located at corresponding positions of the third under-exposure region and in the second image as a fourth under-exposure region.

Step 316: Combine the third over-exposure region of the first image and the fourth over-exposure region of the second image and combine the third under-exposure region of the third image and a fourth under-exposure region of the second image.

Step 318: End.

According to the image processing method 30, a first image is acquired during a first exposure time, a second image is acquired during a second exposure time and a third image is acquired during a third exposure time. The first image, the second image and the third image are contiguously acquired, the first exposure time is smaller than the second exposure time and the second exposure time is smaller than the third exposure time. Next, the computing module used for combining the first image, the second image and the third image divides the second image according to the luminance of each pixel in the second image. In this example, pixels with the luminance greater than a first threshold are determined to be in a first over-exposure region and acquires the image region located at corresponding positions of the first over-exposure region and in the first image as a second over-exposure region. Instead of comparing the whole second image with the first image, the computing module only compares the second over-exposure region of the first image and the first over-exposure region of the second image for detecting a first moving object region comprising the objects moving during the period of acquiring the first image and the second image. The computing module excludes the first moving object region from the second over-exposure region to generate a third over-exposure region. After acquiring the third over-exposure region, the computing module acquires the image region located at corresponding positions of the third over-exposure region and in the second image as a fourth over-exposure region. Note that, the method of detecting the first moving object region can be appropriately modified according to different applications and design concepts. In an example, the luminance difference between the first moving object region in the first image and the second image may be greater than a second threshold. In another example, the first moving object region may be acquired by the MLT method, and is not limited herein.

In addition, the computing module determines pixels with the luminance smaller than a third threshold are determined to be in a first under-exposure region and acquires the image region located at corresponding positions of the first under-exposure region and in the third image as a second under-exposure region. Instead of comparing the whole second image with the third image, the computing module only compares the first under-exposure region of the second image and the second under-exposure region of the third image for detecting a second moving object region comprising the objects moving during the period of acquiring the second image and the third image. The computing module excludes the second moving object region from the first under-exposure region, to generate a third under-exposure region. Next, the computing module acquires the image region located at corresponding positions of the third under-exposure region and in the second image as a fourth under-exposure region. After acquiring the third over-exposure region, the fourth over-exposure region, the third under-exposure region and the fourth under-exposure region, the computing module combines the third over-exposure region of the first image and the fourth over-exposure region of the second image and combines the third under-exposure region of the third image and the fourth under-exposure region of the second image, to generate a high dynamic range image.

Note that, the method of detecting the second moving object region can be appropriately modified according to different applications and design concepts. In an example, the luminance difference between the second moving object region in the second image and the third image may be greater than a fourth threshold. In another example, the second moving object region may be acquired by the MLT method, and is not limited herein.

Please note that, the above mentioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits such as microcircuits, microchips, or silicon chips. Examples of the electronic system can include system on chip (SOC), system in package (Sip), computer on module (COM), and the image capturing device 10.

To sum up, the above examples detects the moving objects in the contiguous images via comparing the regions with the same luminance level. As a result, the computing cost of detecting the moving objects can be reduced and the undesired effect generated by the moving objects can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
   acquiring a first image during a first exposure time, and a second image during a second exposure time, wherein the first exposure time is smaller than the second exposure time;
   acquiring the image region with the luminance greater than a first threshold in the second image as a first over-exposure region;
   acquiring the image region located at corresponding positions of the first over-exposure region and in the first image as a second over-exposure region;
   comparing the second over-exposure region of the first image and the first over-exposure region of the second image, for acquiring a first moving-object region;

excluding the first moving-object region from the second over-exposure region, to generate a third over-exposure region;

acquiring the image region located at corresponding positions of the third over-exposure region and in the second image as a fourth over-exposure region; and combining the third over-exposure region of the first image and the fourth over-exposure region of the second image.

2. The image process method of claim 1, wherein the luminance difference between the first moving object region in the first image and the second image is greater than a second threshold.

3. The image processing method of claim 1, further comprising:

shrinking the first over-exposure region after acquiring the image region with the luminance greater than the first threshold in the second image as the first over-exposure region.

4. The image processing method of claim 1, further comprising:

expanding the first moving-object region before excluding the first moving-object region from the second over-exposure region.

5. The image processing method of claim 1, further comprising:

acquiring a third image during a third exposure time, wherein the second exposure time is smaller than the third exposure time;

acquiring the image region with the luminance smaller than a third threshold in the second image as a first under-exposure region;

acquiring the image region located at corresponding positions of the first under-exposure region and in the third image as a second under-exposure region;

comparing the first under-exposure region of the second image and the second under-exposure region of the third image, for acquiring a second moving-object region;

excluding the second moving-object region from the second under-exposure region, to generate a third under-exposure region;

acquire the image region located at corresponding positions of the third under-exposure region and in the second image as a fourth under-exposure region; and combining the third under-exposure region of the third image and the fourth under-exposure region of the third under-exposure region in the third image.

6. The image processing method of claim 5, wherein the luminance difference between the second moving-object regions in the second image and the third image is greater than a fourth threshold.

7. The image processing method of claim 5, further comprising:

shrinking the first under-exposure region after acquiring the image region with the luminance smaller than the third threshold in the second image as the first under-exposure region.

8. The image processing method of claim 5, further comprising:

expanding the second moving-object region before excluding the second moving-object region from the second under-exposure region.

9. An image processing method, comprising:

acquiring a first image during a first exposure time, and a second image during a second exposure time, wherein the first exposure time is smaller than the second exposure time;

acquiring the image region with the luminance smaller than a first threshold in the first image as an first under-exposure region;

acquiring the image region located at corresponding positions of the first under-exposure region and in the second image as a second under-exposure region;

comparing the first under-exposure region of the first image and the second under-exposure region of the second image, for acquiring a moving-object region;

excluding the moving-object region from the second under-exposure region, to generate a third under-exposure region;

acquiring the image region located at corresponding positions of the third under-exposure region and in the first image as a fourth under-exposure region; and combining the third under-exposure region of the second image and the fourth under-exposure region of the first image.

10. The image processing method of claim 9, wherein the luminance difference between the moving-object regions in the first image and the second image is greater than a second threshold.

11. The image processing method of claim 9, further comprising:

shrinking the first under-exposure region after acquiring the image region with the luminance smaller than the first threshold in the first image as the first under-exposure region.

12. The image processing method of claim 9, further comprising:

expanding the moving-object region before excluding the moving-object region from the second over-exposure region.

* * * * *